United States Patent [19]

Markisello

[11] Patent Number: 4,682,398

[45] Date of Patent: Jul. 28, 1987

[54] METHOD FOR REMOVING FORD IGNITION PIN TYPE CYLINDERS

[76] Inventor: Frank Markisello, 91-10 Liberty Ave., Ozone Park, N.Y. 11417

[21] Appl. No.: 877,189

[22] Filed: Jun. 23, 1986

[51] Int. Cl.[4] ........................ B23P 19/02; B23P 19/00; E05B 15/16; B23B 39/00

[52] U.S. Cl. .................................. 29/426.4; 29/426.5; 70/417; 408/72 R

[58] Field of Search ............... 29/426.4, 426.5, 402.19, 29/244, 252; 70/417, 394, 252; 200/43.08; 408/72, 204, 703

[56] References Cited

U.S. PATENT DOCUMENTS

| | | | |
|---|---|---|---|
| 2,566,145 | 8/1951 | Sandula | 408/72 |
| 2,884,820 | 5/1959 | Pearce | 408/072 |
| 3,798,938 | 3/1974 | McCullum | 70/417 |
| 4,122,695 | 10/1978 | Hall | 70/417 |
| 4,261,093 | 4/1981 | Steffen et al. | 29/426.4 |
| 4,307,983 | 12/1981 | Blough et al. | 29/426.4 |
| 4,586,233 | 5/1986 | Markisello | 29/426.4 |

*Primary Examiner*—Howard N. Goldberg
*Assistant Examiner*—Steven Nichols

[57] ABSTRACT

A method of removing Ford pin ignition lock cylinders in Ford motor vehicles is provided and consists of using three different types of tools, one guide tool, one cutter, and one shim. One guide tool that has pin portions for engaging the pin holes on the face of the Ford ignition lock cylinders, so the cutter can cut around the hard disc for easy removal of said hard disc. One shim, to shim the shearline, to get the cylinder core turned to the on position for easy removal.

1 Claim, 11 Drawing Figures

METHOD FOR REMOVING FORD IGNITION PIN TYPE CYLINDERS

BACKGROUND OF THE INVENTION

1. Field of Invention

The instant invention relates generally to lock cylinders and more specifically it relates to a method of removing the hard disc from all Ford Ignition, pin type cylinders. Then shimming the cylinder to on position for easy removal.

2. Description of the Prior Art

Numerous lock cylinders have been provided in prior art that are adapted to be used for ignitions, the Ford pin type cylinders. For Ford ignitions made in 1976 through the present. There is nothing on the market today that will remove the hard disc from the Ford pin type ignition cylinders.

Since there is no prior art units suitable for the particular purpose stated above, there is a need for the present invention as heretofore described.

SUMMARY OF THE INVENTION

A principle object of the present invention is to provide a method of removing the hard disc from all Ford motor vehicle ignition cylinders which incorporate this disc, to protect the cylinders from drilling, shimming, or pulling, from 1976 to present. Using a guide block which has two [2] holding pins, which fit into the face of the cylinder to hold the guide block steady. Having a guide hole which you insert the special cutting saw. Drill until the special stop built into the saw arbor comes into contact with the guide block, having cut around hard disc, pry disc out. At this time the shear line will be visible. Insert the special shim into the shear line and rake pins until the shim slides into the cylinder, enabling you to turn cylinder to the on position, then poke the locking pin in, the cylinder will slide out. Replace with new cylinder.

A further object is to provide a method of removing the hard disc from ignition cylinders in Ford Motor vehicles, whereby the two special tools are economical in cost to manufacture.

A still further object is to provide method of removing the hard disc from Ford pin type ignition, whereby the two tools are simple and easy to use.

To the accomplishment of the above and related object, this invention may be embodied in form illustrated in the accompanying drawings, attention being called to the fact, however, that the drawings are illustrative only, and that changes may be made in specific construction illustrated and described within the scope of the appended claims.

BRIEF DESCRIPTION OF THE DRAWING FIGURES

FIG. 3 is an exploded perspective view of the guide block ready to be placed into the two detent holes, where the detent pins were removed from.

DETAILED DESCRIPTION OF THE PREFERRED EMBODIMENTS

Figure 1:
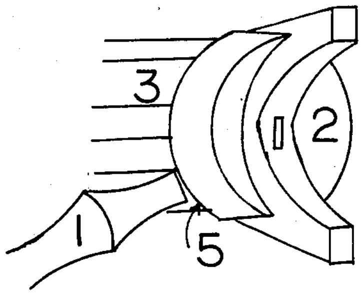
FIG. 1 is an exploded perspective view of a screwdriver being used to pry off the Wing Nut of the Ford Ignition lock cylinder which incorporates a hard disc.
Figure 2:
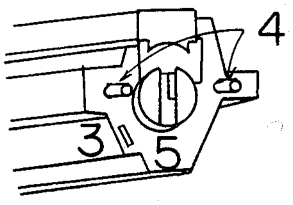
FIG. 2 is an exploded perspective view of a Ford Ignition cylinder with two detent pins being removed.
Figure 3:
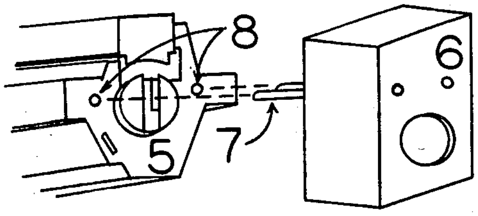
Figure 4:
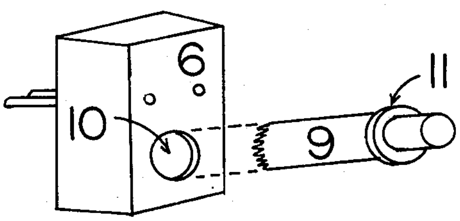
FIG. 4 is an exploded perspective view of the special cutting saw and arbor, being inserted into the guide block drilling hole, and drilling until the special stop on the arbor comes in contact with guide block.
Figure 5:
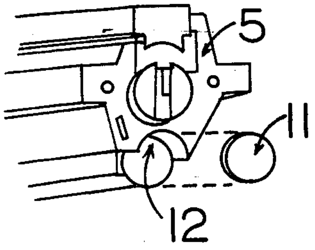
FIG. 5 is an exploded perspective view of the hard disc being removed and the shear line made visible.
Figure 6:
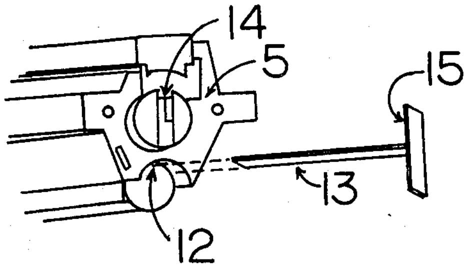
FIG. 6 is an exploded perspective view of a special shim being inserted into the shear line space. While the pins are being racked, the shim will slide into the cylinder, until it comes to the stop.
Figure 7:
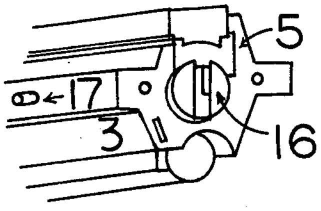
FIG. 7 is an exploded perspective view of the cylinder core being turned to the on position. The locking pin is being pushed in, the cylinder will now slide out, insert new cylinder.

Turning now descriptively to the drawings in which similar reference characters denote similar elements through out the several views. FIGS. 8, 9, 10, and 11, best illustrates the basic parts of the invention, being a guide block 6, cutting saw and arbor 9 a shim 13.

Figure 8:
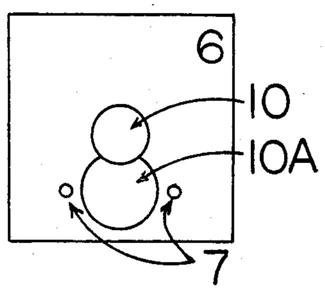
FIGS. 8 and 9 show views of the guide block.
Figure 9:
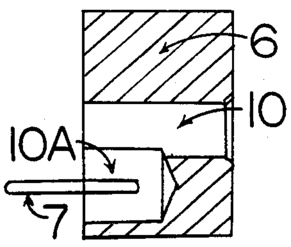

FIGS. 8 and 9 is a guide block 6, consisting of a block portion 6, having a guide hole 10, a blind 10*a* [2], guide pins 7.

Figure 10:
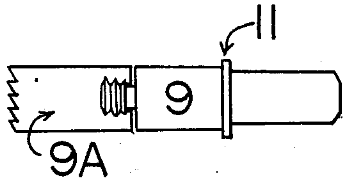
FIG. 10 shows a view of the cutting tool.

In FIG. 10, the cutting tool 9, consisting of a cutting saw having a threaded female end 9*a*, an arbor having a threaded male end 9, a stop, 11.

Figure 11:
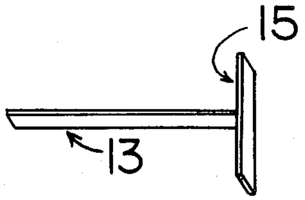
FIG. 11 shows a shim having a stop.

FIG. 11, the shim 13, having a stop 15.

To understand how the guide tool 6 and cutter 9 are used the following steps are described and illustrated in FIGS. 1 through 7 for: removing hard disc from Ford ignition pin cylinders, 1976 to the present.

1. Using screwdriver 1, pry the wing nut off 2 from the ignition cylinder 5, which is in the steering column 3.

2. Remove two detent pins 4, from the face of the cylinder 5, which is in the steering column 3.

3. Insert the guide block 6, which has two pins inbeded 7, into the face of the cylinder 5, using the two holes 8, as guides to hold the pins 7 to stabilize the guide block 6, in place.

4. Now insert special cutter 9, into guide hole 10, in guide block 6, and drill straight in until the stop 11, comes in contact with the guide block 6.

5. Remove special cutter 9 and guide block 6, and pry the hard disc out 11, from cylinder face 5, and the shear line will now be visible 12.

6. Take the shim tool 13, and insert it into the shear line 12, on the face of cylinder 5, apply slight pressure on shim tool 13, pushing it into the shear line space 12, while raking pins with a pick through keyway 14, shim will slide into the cylinder until it comes to the stop 15.

7. Turn the cylinder core 16, to the on position, then push the locking pin 17, in cylinder will now slide out of the steering wheel column 3, replace with a new cylinder.

What is claimed is:

1. A method of removing an ignition lock cylinder having a hard disc, from Ford motor vehicles made between 1976 to present, which comprises:

(a) remove wing nut from said ignition lock, (b) removing two detent pins from face of ignition cylinder, (c) placing the guide pin portions of the guide tool into said ignition lock cylinder, having two detent holes in face of cylinder, (d) insert cutter into the guide hole in block, drilling until stop on the cutter comes into contact with the guide block, (e) remove said cutter from guide hole in guide block, (f) remove said pin portion of said guide block, from said pin holes of said ignition lock cylinder, (g) removing said hard steel disc from said ignition lock cylinder, (h) insert shim into shear line of said ignition lock cylinder, while raking pins through the key way, (i) when said shim is shimmed into the cylinder up to the stop of the shim, turn cylinder core to the on position and push the cylinder locking pin in, (j) slide the cylinder out and install new cylinder.

* * * * *